United States Patent [19]

Jones

[11] 4,345,175
[45] Aug. 17, 1982

[54] MEANS FOR REDUCING SHEAR STRESSES ON WINDING CONDUCTOR INSULATION FOR AIR-GAP DYNAMOELECTRIC MACHINES

[75] Inventor: Donald W. Jones, Burnt Hills, N.Y.

[73] Assignee: General Electric Company, Schenectady, N.Y.

[21] Appl. No.: 203,316

[22] Filed: Nov. 3, 1980

[51] Int. Cl.³ .............................................. H02K 15/12
[52] U.S. Cl. ....................................... 310/45; 310/43; 310/214; 310/215
[58] Field of Search ..................... 310/43, 45, 91, 214, 310/215, 218, 188, 192, 194, 254, 258, 259, 104

[56] References Cited

U.S. PATENT DOCUMENTS

| | | | |
|---|---|---|---|
| 3,505,729 | 4/1970 | Balke | 310/214 |
| 4,001,616 | 1/1977 | Lonseth | 310/45 |
| 4,008,409 | 2/1977 | Rhudy | 310/45 |
| 4,137,471 | 1/1979 | Sato | 310/45 |
| 4,224,541 | 9/1980 | Smith | 310/45 |
| 4,237,398 | 12/1980 | Chigirinsky | 310/214 |
| 4,239,998 | 12/1980 | Hakamada | 310/45 |

FOREIGN PATENT DOCUMENTS

| | | | |
|---|---|---|---|
| 2208029 | 8/1973 | Fed. Rep. of Germany | 310/45 |
| 364833 | 11/1962 | Switzerland | 310/45 |

*Primary Examiner*—R. Skudy
*Attorney, Agent, or Firm*—Charles E. Bruzga; James C. Davis, Jr.; Marvin Snyder

[57] ABSTRACT

In an air-gap dynamoelectric machine, relative movement between insulation on a winding conductor disposed in the air-gap and the adjacent surface of a channel in which a winding conductor is supported can give rise to shear stresses imposed on the insulation. The present invention provides an envelope between the insulation and the channel surface to reduce any shear stresses on the insulation. The envelope provides interior major, confronting surfaces, slidable with respect to each other, and which are not subject to contamination by thermosetting resin applied to parts of the dynamoelectric machine during manufacturing thereof.

21 Claims, 2 Drawing Figures

MEANS FOR REDUCING SHEAR STRESSES ON WINDING CONDUCTOR INSULATION FOR AIR-GAP DYNAMOELECTRIC MACHINES

BACKGROUND OF THE INVENTION

The present invention relates to means for reducing shear stresses between the stator winding conductor insulation of an air-gap dynamoelectric machine and the adjacent surface of a channel in which the conductor is supported.

Air-gap dynamoelectric machines include stator winding conductors disposed in the air-gap separating the rotor and the stator magnetic core of the machine. Such stator winding conductors have insulation thereon and are supported in channels formed from the adjacent surfaces of the conductor support means. In operation of an air-gap dynamoelectric machine, relative thermal expansion between such an insulated conductor and the adjacent surface of such a channel can give rise to high shear stresses on the insulation, which stresses can damage the insulation and result in dielectric breakdown thereof. One known approach to reducing the problem of shear stresses is to provide low coefficient of friction material between the conductor insulation and the channel surface. This approach, however, is subject to failure where the interface between conductor insulation and a channel surface has been contaminated by thermosetting resin applied to portions of the air-gap dynamoelectric machine during the manufacturing thereof, whereby the insulation becomes bonded to the channel surface.

A first known approach to the prevention of thermosetting resin contamination of an interface between conductor insulation and a channel surface in an air-gap dynamoelectric machine is to strive, during manufacturing of the dynamoelectric machine, to prevent excess uncured thermosetting resin from reaching the conductor insulation or channel surface. This approach has been only partially successful owing to the difficulty of precisely limiting the flow of excess uncured resin.

A second known approach to overcoming the problem of contamination of a conductor insulation-channel surface interface by thermosetting resin is to coat the conductor insulation and the channel surface with release agents which form a weak bond to any applied thermosetting resin. This approach, however, is only applicable where the conductor insulation does not have a rough surface, such an an "armor" layer on stator winding conductors, which permits thermosetting resin to "key" into the rough surface.

OBJECTS OF THE INVENTION

Accordingly, it is an object of the present invention to provide means for reducing the shear stresses between the stator winding conductor insulation of an air-gap dynamoelectric machine and an adjacent surface of a channel in which the conductor is supported, the effectiveness of which means is not subject to diminution due to thermosetting resin which may reach the conductor insulation or the channel surface during manufacturing of the machine.

Other objects and advantages of the present invention will become apparant from a reading of the remainder of this specification in conjunction with the drawing figures.

SUMMARY OF THE INVENTION

In carrying out the present invention in one form, there is provided an improved means for reducing shear stresses on insulation for stator winding conductors used in air-gap dynamoelectric machines which are subjected to application of thermosetting resin during the manufacturing thereof. An insulated stator winding conductor is supported in a channel, the channel having a surface adjacent the conductor insulation. An envelope is disposed between the conductor insulation and the channel surface. The envelope is formed from a pair of polyester film sheets which are substantially impervious to the thermosetting resin, provide a set of major, confronting surfaces slidable with respect to each other, and are edge-sealed together to protect the confronting surfaces from contamination by thermosetting resin. The envelope may advantageously be provided with a powdered low coefficient of friction material to lubricate the confronting surfaces.

DETAILED DESCRIPTION

Figure 1:
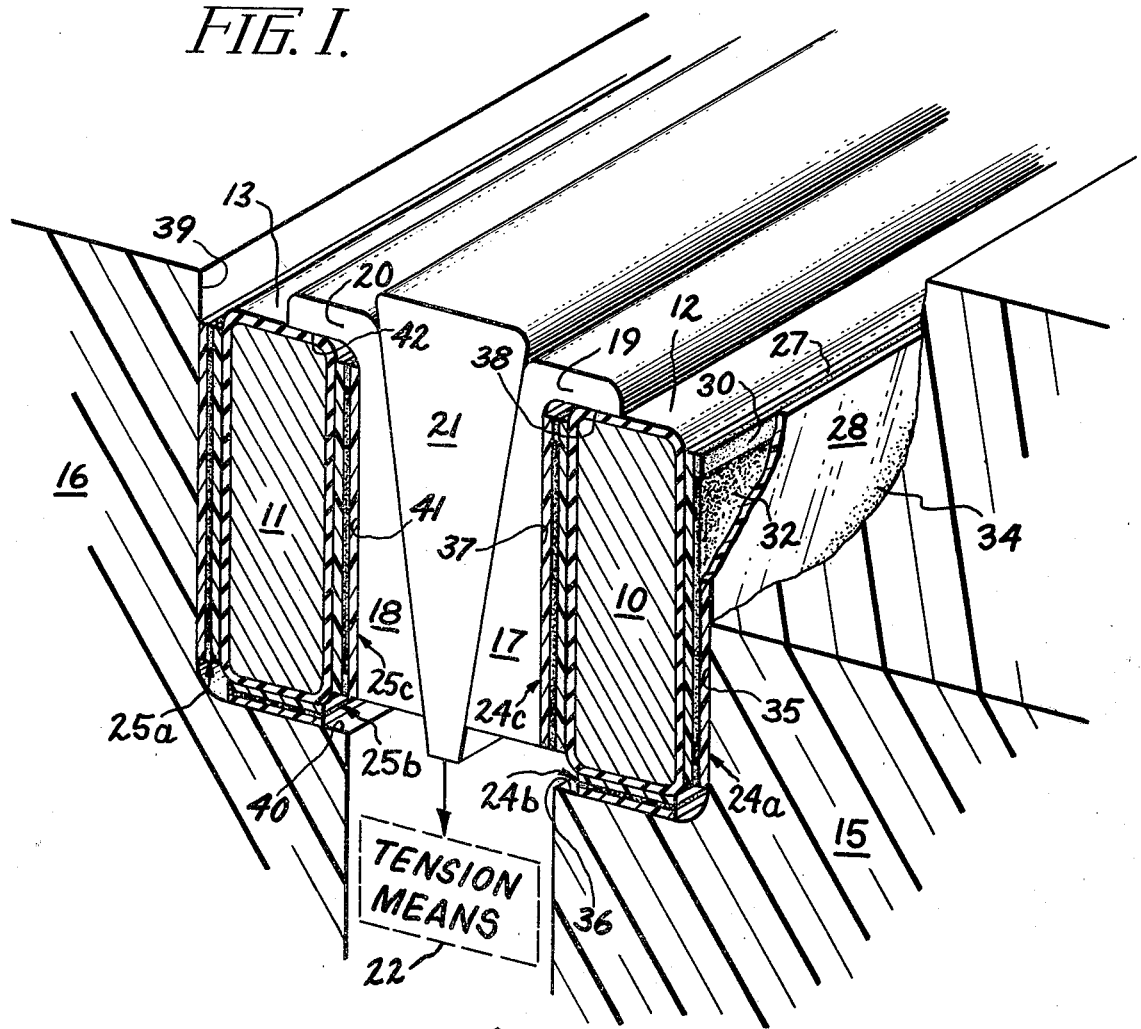
FIG. 1 is a perspective view, partially in cross-section, of rectangular, insulated stator winding conductors supported in channels of a mounting structure for the stator bars, the mounting structure being partially removed to illustrate details of an envelope according to the present invention.

There is shown in FIG. 1 a pair of stator winding conductors 10 and 11 which are adapted to be placed in an airgap dynamoelectric machine. The stator winding conductors 10 and 11 are provided with respective layers of insulation 12 and 13 therein. The stator winding conductors 10 and 11 are supported in the air gap by respective mounting teeth 15 and 16 which are in fixed relation to the stator magnetic core (not shown).

The teeth 15 and 16 may comprise fiber-reinforced plastic, as more fully described in U.S. patent application Ser. No. 14,942, filed on Feb. 26, 1979, by T. A. Keim and myself, now U.S. Pat. No. 4,281,264, assigned to the same assignee as is the present application, and incorporated herein by reference. The stator winding conductors 10 and 11 are also supported by a wedging system comprising stationary wedges 17 and 18, a cooperating movable wedge 21, and a tension means 22 for providing a tensile force on the movable wedge 21 radially outward of the stator. The movable wedge 21 is disposed between the stator winding conductors 10 and 11 with the wider end thereof upward as viewed in FIG. 1 or more proximate the rotor (not shown) than the narrower end thereof. The stationary wedges 17 and 18 are each disposed between a respective conductor 10 or 11 and the movable wedge 21 with each narrower end thereof upward as viewed in FIG. 1 or more proximate the rotor (not shown) than the wider end thereof. Affixed to each of stationary wedges 17 and 18 at the narrower end thereof are respective projections 19 and 20 generally orthogonal to the respective wedges 17 and 18 and which project over at least part of the respective stator winding conductors 10 and 11. Each of projections 19 and 20 serves to provide a positive restraint for the respective one of stator winding conductors 10 and 11 against movement in the radially inward direction. The cooperative action of the movable wedge 21, the tension means 22 and the stationary wedges 17 and 18 serves to secure the stator winding conductors 10 and 11 under continuous radial and circumferential compression with respect to the longitudinal axis of the stator. Further details of the foregoing wedging system are provided in the above-referenced patent application.

Collectively, the teeth 15 and 16 and the stationary wedges 17 and 18 define therebetween channels which support the stator winding conductors 10 and 11. The channel supporting conductor 10 comprises the following surfaces adjacent the insulation layer 12; surfaces 35 and 36 of the tooth 15 and surfaces 37 and 38 of the stationary wedge 17. Likewise, the channel supporting the insulation layer 13 comprises the following surfaces adjacent the insulation layer 13: surfaces 39 and 40 of the tooth 16 and surfaces 41 and 42 of the stationary wedge 18. Each of the foregoing channels is generally U-shaped and extends in a direction generally parallel to the longitudinal axis of the rotor. In an air-gap dynamoelectric machine incorporating these channels and the stator winding conductors 10 and 11, operating factors of the machine, such as different rates of thermal expansion between the conductors 10 and 11 and the respective, adjacent channel surfaces, whereby shear stresses are imposed on the insulation layers 12 and 13. These shear stresses can result in damage to the insulation 12 and 13 and possible failure thereof. To minimize the occurrence of such shear stresses on the insulation layers 12 and 13, envelopes 24a, 24b, and 24c are disposed between the insulation 12 and the channel surfaces 35, 36 and 37, respectively, and envelopes 25a, 25b, and 25c are placed between the insulation 13 and the surfaces 39, 40, and 41, respectively. Each envelope, shown in FIG. 1 in greatly enlarged form relative to the other parts of the machine therein illustrated has respective interior, confronting surfaces slidable with respect to each other. The envelopes 24a–24c and 25a–25c are not subject to contamination by thermosetting resin, which may be used in manufacturing a dynamoelectric machine incorporating the stator winding conductors 10 and 11 (hereinafter, simply "thermosetting resin").

Figure 2:
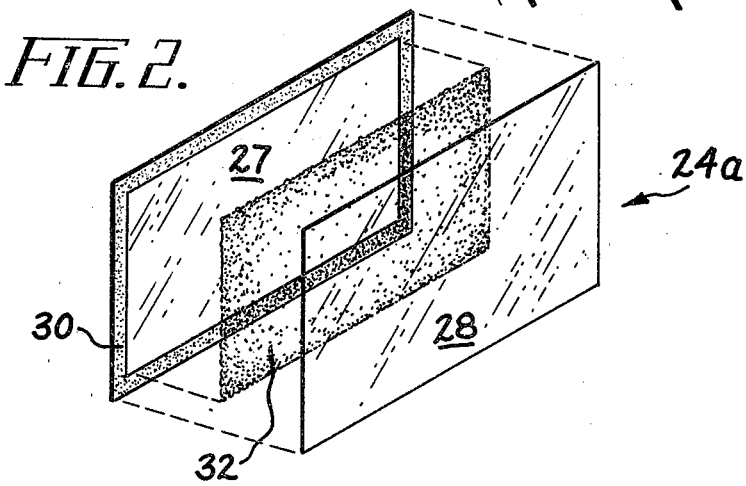
FIG. 2 is an exploded view of an envelope according to the present invention.

Each envelope is constructed identically to the envelope 24a, except for envelope size, and therefore, the details of construction of only the envelope 24a are described. The envelope 24a, shown in full in an exploded view in FIG. 2, comprises rectangular sheets 27 and 28 edge-sealed together by an adhesive strip 30 disposed between the sheets 27 and 28 near the edges thereof, and a low coefficient of friction material 32 disposed between the sheets 27 and 28. The sheets 27 and 28 are formed of a material substantially impervious to thermosetting resin, and provide major, confronting surfaces which are slidable with respect to each other. Additionally, these sheets 27 and 28 must possess the capability of withstanding the heat, pressure and other environmental conditions encountered in both the manufacturing and the operation of an air-gap dynamoelectric machine incorporating the envelope 24a. Further, in order to prevent rupture of the envelope 24a and contamination of the confronting surfaces thereof by thermosetting resin, during the manufacturing and operation of the machine, the sheets must possess the appropriate abrasion resistance, tearing resistance and strength. It has been found that a suitable material for the sheets 27 and 28 is Mylar ® polyester film (polyethylene terephthalate), typically having a thickness between one thousandth and five thousandths of an inch.

In alternative embodiments of the invention, each group of envelopes 24a–24c and 25a–25c could be replaced with respective singular envelopes at a given location along the longitudinal axis of the rotor. Further, series of envelopes could be provided on the insulation 12 or 13 along the longitudinal axis of the rotor, as opposed to the provision of continuous envelopes.

The envelope 24a is adequately sealed or enclosed by the adhesive stripe 30 to substantially eliminate thermosetting resin from reaching and contaminating the confronting surfaces of the sheets 27 and 28. The adhesive stripe 30 must possess the capability of withstanding the heat, pressure and other environmental conditions existing during the manufacturing process of an air-gap dynamoelectric machine incorporating the invention in order to fulfill the specific purpose of preventing contamination of the confronting surfaces of sheets 27 and 28 by thermosetting resin. In an alternative embodiment, an envelope 24a, which is adequately sealed or enclosed to substantially eliminate contamination by thermosetting resin of the interior, major, confronting surfaces thereof, can comprise a very long, flattened, seamless tube of sheet material forming an envelope with unsealed ends. The intermediate portion of such an envelope, spaced from the ends of the envelope is thereby not subject to contamination by thermosetting resin.

The low coefficient of friction material 32 may advantageously be contained in the envelope 24a and may comprise powdered Teflon ® resin (polytetrafluoroethylene), graphite, or molybdenum disulfide. The layer of material 32 comprising the low friction particles is advantageously less than about one thousandth of an inch thick.

Shear stresses which may be imposed on the insulation layers 12 and 13 are larger for long interfaces between the insulation layers 12 and 13 and the respective channel surfaces. Thus, where short interfaces are involved, the slidable, confronting surfaces in accordance with the present invention may not be required, the criterion herefor being the tolerability of any shear stresses which occur. A short interface possibly not requiring slidable, confronting surfaces may exist, for example, between the surfaces 37 and 41 of the stationary wedges 17 and 18, respectively, and the respective insulation layers 12 and 13. The envelopes 24c and 25c, however, serve the additional purpose of facilitating sliding of the stationary wedges 17 and 18 into final position on the respective stator winding conductors 10 and 11 when the cooperating movable wedge 21 is subject to the force of the tension means 22.

The envelope 24a may be bonded to the tooth 15 by adhesive 34 or to the insulation 12 by other adhesive (not shown) in order to facilitate the provision of the envelope 24a in its position as illustrated in FIG. 1. Likewise, the other envelopes may be bonded to either the insulation 12 or 13 or to the respective channel surfaces by other adhesive (not shown.)

While the present invention has been described with respect to a specific embodiment, modifications of the invention will occur to those skilled in the art. For example, the specific air-gap stator winding conductor mounting structure illustrated herein could be modified to include another pair of stator winding conductors, radially-adjacent the illustrated stator winding conductors with respect to the longitudinal axis of the stator, and supported by modified teeth structure 15 and 16. An example of such modified stator winding conductor mounting structure is described in the above-referenced patent application. Accordingly, the foregoing and all such modifications are considered to fall within the spirit and scope of the invention as defined in the appended claims.

What I claim as my invention and desire to have secured by Letters Patent of the United States is:

1. In an air-gap dynamoelectric machine having a rotor rotatable about a longitudinal axis thereof and a stator magnetic core separated from said rotor by an air-gap, the combination comprising:
   (a) a stator winding conductor having a layer of insulation thereon;
   (b) stator winding conductor support means disposed in said air-gap in fixed relation to said stator magnetic core for supporting said conductor, said support means having at least one surface adjacent said conductor insulation;
   (c) an envelope disposed between said conductor insulation and said at least one surface, said envelope having a pair of interior, major, confronting surfaces slidable with respect to each other, and comprising at least one sheet of material substantially impervious to thermosetting resin.

2. The apparatus of claim 1 wherein said envelope is adequately sealed to substantially eliminate contamination of said confronting surfaces by thermosetting resin.

3. The apparatus of claim 1 or 2 wherein said envelope comprises a pair of sheets of material substantially impervious to thermosetting resin, said pair of sheets being edge-sealed.

4. The apparatus of claim 1 or 2 wherein each of said at least one sheet has a thickness approximately between one thousandth and five thousandths of an inch.

5. The apparatus of claim 4 wherein said at least one sheet is formed from polyester film.

6. The apparatus of claim 5 wherein said at least one sheet is formed from polyethylene terephthalate film.

7. The apparatus of claim 1 or 2 wherein a low coefficient of friction material is disposed between said confronting surfaces.

8. The apparatus of claim 7 wherein said low coefficient of friction material is in a powdered form.

9. The apparatus of claim 7 wherein said low coefficient of friction material is polytetraflouroethylene resin.

10. The apparatus of claim 8 wherein said powdered low coefficient of friction material forms a layer disposed between said confronting surfaces and has an average thickness less than about one thousandth of an inch.

11. The apparatus of claim 10 wherein said low coefficient of friction material is polytetraflouroethylene resin.

12. The apparatus of claim 1 or 2 wherein said at least one surface and said stator winding conductor extend in a generally longitudinal direction and a series of said envelopes is disposed between said conductor insulation and said at least one surface parallel to the longitudinal axis of said rotor.

13. The apparatus of claim 1 or 2 wherein said envelope is disposed between substantially the entire area of said at least one surface and said conductor insulation at a given location along the longitudinal axis of said rotor.

14. The apparatus of claim 1 or 2 wherein said at least one surface is generally U-shaped and extends in a direction generally parallel to said axis of said rotor and a plurality of said envelopes is disposed between substantially the entire area of said at least one surface and said conductor insulation at a given location along the longitudial axis of said rotor.

15. The apparatus of claim 1 or 2 wherein said envelope comprises a long, flattened, seamless tube formed from said at least one sheet of material, said tube having unsealed ends.

16. The apparatus of claim 1 or 2 further comprising means for adhering an outer surface of said envelope to said conductor insulation.

17. The apparatus of claim 1 or 2 further comprising means for adhering an outer surface of said envelope to said at least one surface.

18. The apparatus of claim 1 or 2 wherein said stator winding support means comprises:
   (a) a stator tooth disposed in said air-gap in fixed relation to said stator magnetic core; and
   (b) a stationary wedge disposed in said air-gap with the wider end thereof more proximate said rotor than the narrower end thereof; and wherein
   (c) said at least one surface comprises the adjacent surfaces of said stator tooth and said stationary wedge.

19. The apparatus of claim 18 wherein a projection is affixed to the narrower end of said stationary wedge, is generally orthogonal to said stationary wedge, and projects over at least part of said stator winding conductor.

20. The apparatus of claim 18 wherein at least part of said envelope is disposed between said insulation on said stator winding conductor and said stator tooth.

21. The apparatus of claim 20 wherein at least part of said envelope is disposed between said insulation of said stator winding conductor and said stationary wedge.

* * * * *